United States Patent [19]

Savkar et al.

[11] Patent Number: 4,736,712
[45] Date of Patent: Apr. 12, 1988

[54] SELF PURGING DUAL FUEL INJECTOR

[75] Inventors: Sudhir D. Savkar, Schenectady; Gary L. Leonard, Clifton Park, both of N.Y.

[73] Assignee: General Electric Company, Schenectady, N.Y.

[21] Appl. No.: 936,672

[22] Filed: Dec. 1, 1986

[51] Int. Cl.⁴ ............................................. F02B 45/02
[52] U.S. Cl. ..................................... 123/23; 123/299; 123/304; 123/575
[58] Field of Search ............... 123/23, 299, 300, 304, 123/526, 527, 575, 576, 577; 137/625.12, 625.13; 239/415, 416

[56] References Cited

U.S. PATENT DOCUMENTS

| | | | |
|---|---|---|---|
| 1,419,231 | 6/1922 | Crossley et al. | 123/304 |
| 1,897,819 | 2/1933 | Pawlikowski | 123/23 |
| 1,962,283 | 6/1934 | Nordberg | 123/304 |
| 2,613,998 | 10/1952 | Noon | 299/88 |
| 2,813,752 | 11/1957 | Pringham | 299/107.2 |
| 3,122,326 | 2/1964 | Cook | 239/415 |
| 3,982,693 | 9/1976 | Hulsing | 239/88 |
| 4,059,077 | 11/1977 | Steiger | 123/23 |
| 4,086,883 | 5/1978 | Steiger | 123/23 |
| 4,481,921 | 11/1984 | Tsukahara | 123/575 |
| 4,499,862 | 2/1985 | Bäumer | 123/304 |
| 4,612,905 | 9/1986 | Dietrich et al. | 123/575 |

FOREIGN PATENT DOCUMENTS

| | | | |
|---|---|---|---|
| 2235083 | 1/1974 | Fed. Rep. of Germany | 123/300 |
| 56-56962 | 5/1981 | Japan | 123/575 |
| 57-7477 | 11/1983 | Japan | 123/300 |
| 1014131 | 12/1965 | United Kingdom | 123/300 |

Primary Examiner—Ira S. Lazarus
Assistant Examiner—Sue Hagarman
Attorney, Agent, or Firm—William H. Steinberg; James C. Davis, Jr.; Paul R. Webb, II

[57] ABSTRACT

A self purging dual fuel injector has a valve which is pressed down, as opposed to lifting, to provide a pilot charge to the combustion chamber. As the valve further extends from the injector the pilot fuel flow is cut off and coal water slurry flows through the valve to the combustion chamber. During shut off of the slurry the retracting valve allows a shot of pilot fuel to purge the valve passageways.

2 Claims, 2 Drawing Sheets

SELF PURGING DUAL FUEL INJECTOR

BACKGROUND OF THE INVENTION

The present invention relates to dual fuel single injectors for use with coal fired diesels.

In coal fired diesels it is desirable to provide as the first charge in a cycle a small quantity of diesel fuel referred to as the pilot charge. The pilot charge fires very quickly increasing chamber pressure and temperature resulting in more rapid ignition of the coal/water slurry injected immediately following the pilot charge. Presently, a separate injector can be provided for injecting pilot fuel and a separate coal water slurry injector can be provided to add the slurry. A stratified single nozzle injector can alternatively be used. A stratified single nozzle injector has coal water slurry and pilot fuel in the same chamber of the injector which separate or stratify. When the pilot fuel and slurry are injected into the combustion chamber, pilot fuel is introduced first into the combustion chamber followed by the coal water slurry. The performance of the stratified charge injector is better than that of the separate pilot fuel in coal water slurry injectors because of the better heating of the coal/water slurry which is delivered in the same spray pattern location as the previously ignited pilot fuel. However there are several drawbacks to stratified charge nozzles. The main problem is that over time wear in the moving parts of the nozzle caused by the coal water slurry increase the amount of pilot fuel introduced with each firing and control over the ratio of pilot fuel to coal water slurry is lost.

It is an object of the present invention to provide a dual fuel single injector nozzle for use with slurry fuels.

It is a further object of the present invention to provide a self purging dual fuel injector for use with slurry fuels.

It is a further object of the present invention to provide a self purging dual fuel injector that can provide just diesel pilot fuel during selected low load operations.

SUMMARY OF THE INVENTION

In one aspect of the present invention a dual fuel injector is provided comprising a housing defining an interior bore, a slurry inlet port and a pilot fuel inlet port. A plunger is slidably mounted in the bore with one end of the plunger forming a valve. A portion of the valve extends through the housing to the exterior of the housing. Bias means resist movement of the valve outside of the housing. The valve portion of the plunger defines a passageway providing flow communication from the periphery of the valve adjacent the bore, to a plurality of apertures located in the portion of the valve exterior to the housing. The housing defines a passageway in flow communication with the slurry inlet port and extending to the bore adjacent the valve. The housing further defines a passageway in flow communication with the pilot fuel inlet port and extending to the bore adjacent the valve. Flow communication between the pilot fuel inlet port through the valve to the exterior of the housing is established when the valve is extended from the housing against the resistance of the bias means to a first position. Flow communication is established from the slurry inlet port through the valve to the exterior of the housing when the valve is further extended from the housing to a second position. Flow through the valve ceases when the valve does not extend far enough to reach the first position.

BRIEF DESCRIPTION OF THE DRAWING

The features of the invention believed to be novel, are set forth with the particularity in the appended claims. The invention itself, however, both as to organization and method of operation, together with further objects and advantages thereof, may best be understood by reference to the following description taken in conjunction with the drawing in which:

DETAILED DESCRIPTION OF THE DRAWING

Figure 1:
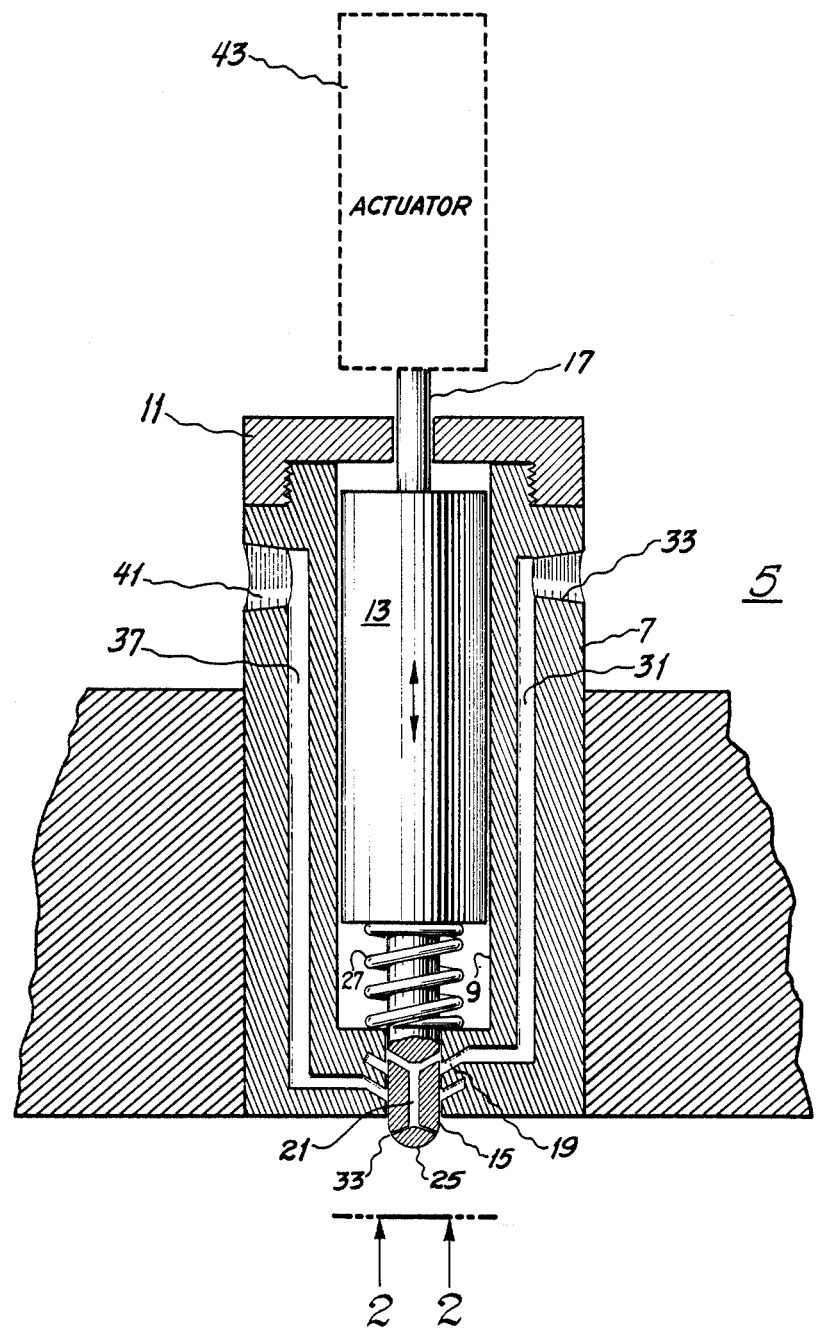
FIG. 1 is a cross sectional view of a self purging dual fuel injector in accordance with the present invention.
Figure 2:
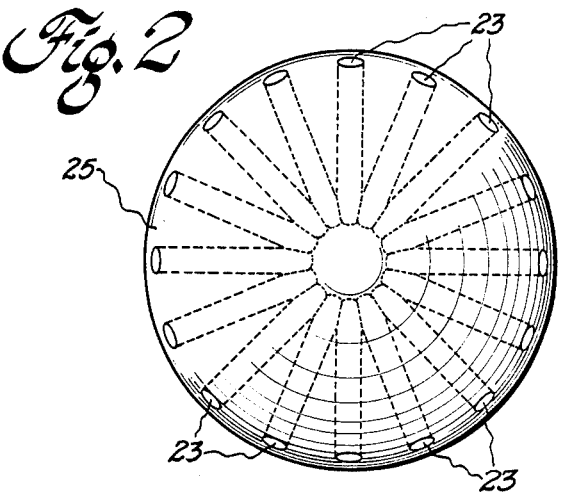
FIG. 2 is an enlarged end view of the valve along the lines 2—2 of FIG. 1.

Referring now to the drawing wherein like numerals indicate like elements throughout and more particularly FIG. 1 thereof, a self purging dual fuel injector 5 is shown. The injector comprises several parts which are stationary and are referred to collectively as the housing. The housing comprises a valve body 7 defining a bore 9. A threaded cap 11 defining a central aperture is threadingly engaged with end of the valve body 7. A plunger 13, having a slotted valve 15 formed on one end and a valve stem 17 on the other, is slidably mounted in the bore. The slotted valve has two passageways 19 leading from the slots that extend from the outside of the valve to a longitudinal passageway 21 which leads to a plurality of radially spaced apertures 23 situated on the valve tip 25. The valve tip is located outside the valve body 7 and serves as a spray nozzle. The valve stem 17 extends through the aperture in the threaded cap 11 to the exterior of the injector 5. A bias means, shown as a helical spring 27, is positioned so that the valve end of the plunger passes through the spring and the spring is compressed between the broader portion of the plunger 13 and the valve body 7. The spring urges the valve portion of the plunger inwardly reducing the amount of the valve tip extending outside the valve body. The plunger has a keyway (not shown) to keep the plunger from rotating about its longitudinal axis. The passageways 19 of valve 15 align with the outlets of a pilot fuel passageway 31 in the valve body when the exposed end of the valve stem is partially depressed against the resistance of the spring. The passageway 31 is in flow communication with a threaded pilot fuel inlet port 33. When the valve stem 17 is further depressed, the passageways 19 of the valve align with the outlets of passageway 37 which is in flow communication with a threaded slurry inlet port 41. Clearance between the valve periphery and the bore above where passageway 33 enters the bore is tight, created by highly finishing both surfaces. Below where pilot fuel enters the bore there can be more clearance so that the pilot fuel can be allowed to bleed down the valve 15 to keep the slurry particles from abrading the sliding surfaces.

In operation the plunger is depressed at valve stem 17 by an actuator 43 which can comprise an electromagnetic actuator or a mechanical actuator such as a cam. The plunger is depressed a predetermined distance so that the passageways 19 of the valve are aligned with the outlets of passageway 31 to allow pilot fuel which can comprise diesel fuel to flow into the valve and be sprayed out apertures 23, which extend into a combustion chamber (not shown). When the plunger 17 is further depressed a predetermined distance, the pilot fuel flow is cut off and the valve passageways 19 align with the the-outlets of passageway 37 allowing coal water slurry to enter the valve and be sprayed out the valve apertures 23. When the plunger is retracted, coal/water slurry flow is cut off and the valve passageways 19 again align with the outlets of passageway 31, allowing the pilot fuel to purge the valve passageways 19, 21 and 23. The pilot fuel also bleeds from the outlets of pilot fuel passageway 31 during operation to keep the outside of the valve clean.

During diesel engine idling and low speed operation, reliable engine performance and smooth operation cannot be obtained with coal water slurry injection. The engine however can be run with the present dual fuel injector by partially depressing the plunger to introduce pilot fuel when necessary during the cycle and sequentially introducing pilot fuel and coal water slurry only during higher load operation.

Figure 3:
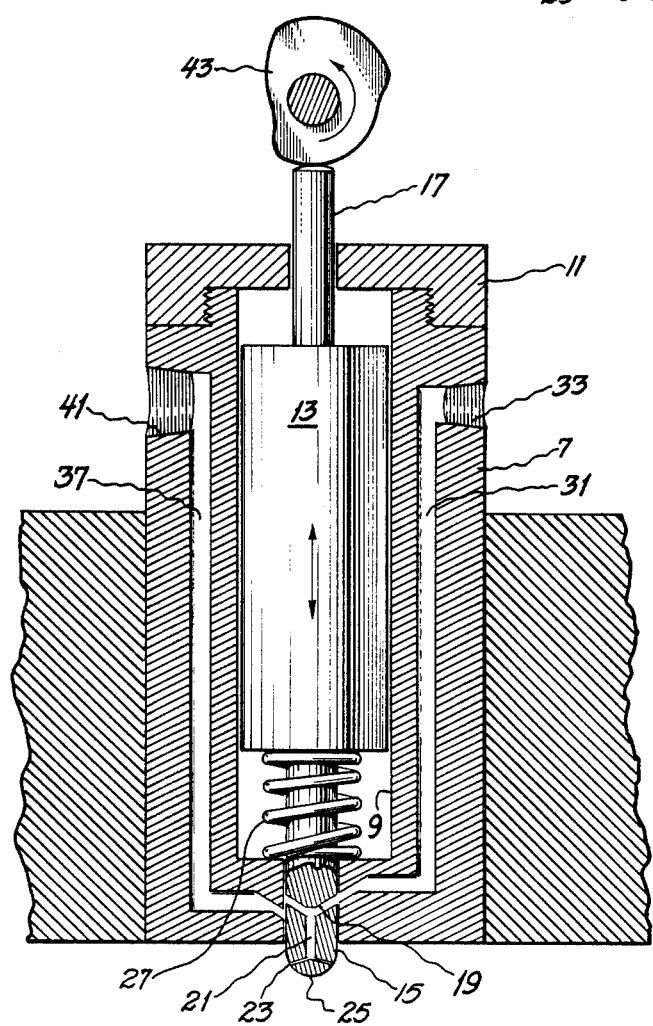
FIG. 3 is a cross sectional view of another embodiment of a self purging dual fuel injector in accordance with the present invention.

Another embodiment of the present invention is shown in FIG. 3. The embodiment of FIG. 3 is similar to the embodiment of FIG. 1 except that the outlets of the passageways for supplying the coal water slurry and pilot fuel are placed on opposite sides of the valve allowing a very small motion of the plunger to close off one passageway and open the other.

The foregoing has described a self purging dual fuel injector for use with slurry fuels that can provide just pilot fuel during selected engine operations.

While the foregoing has been disclosed with reference to several preferred embodiments thereof, it will be clear to those skilled in the art that various changes in form and details may be made therein without departing from the spirit and scope of the invention.

What is claimed is:

1. A dual fuel injector comprising:
  a housing defining an interior bore having one end extending through the housing to the housing exterior, a pilot fuel inlet port, a first outlet situated in said bore, a first passageway coupling said pilot fuel inlet port to the first outlet, a slurry inlet port, a second outlet situated in said bore and a second passageway coupling said slurry inlet port to the second outlet, the first outlet being situated further from the end of the bore extending to the housing exterior than the second outlet;
  bias means; and
  a plunger slidably mounted in said bore, one end of said plunger forming a valve, a portion of said valve extendable through said housing to the exterior of said housing, said bias means resisting movement of said valve outside said housing, said valve defining a passageway providing flow communication from the periphery of said valve adjacent the bore to a plurality of apertures located in the portion or the valve extendable to the exterior of the housing, flow communication from the first outlet situated in said bore through said valve to the exterior of the housing being established when said valve extends from said housing against the resistance of said bias means to a first position aligning said first outlet and said passageway in the valve periphery and flow communication being established between said second outlet situated in said bore through said valve to the exterior of the housing when said valve futher extends from said housing against said bias means to a second position aligning said second outlet and said passageway in the valve periphery, flow through said valve ceasing when said valve does not extend far enough from said housing to reach the first position.

2. The injector of claim 1 wherein the clearance between said valve and said bore in the region of the bore between the first outlet and the exterior of the housing being greater than the clearance between said valve and said bore in region extending from the first outlet away from the housing exterior.

* * * * *